United States Patent Office 3,093,372
Patented June 11, 1963

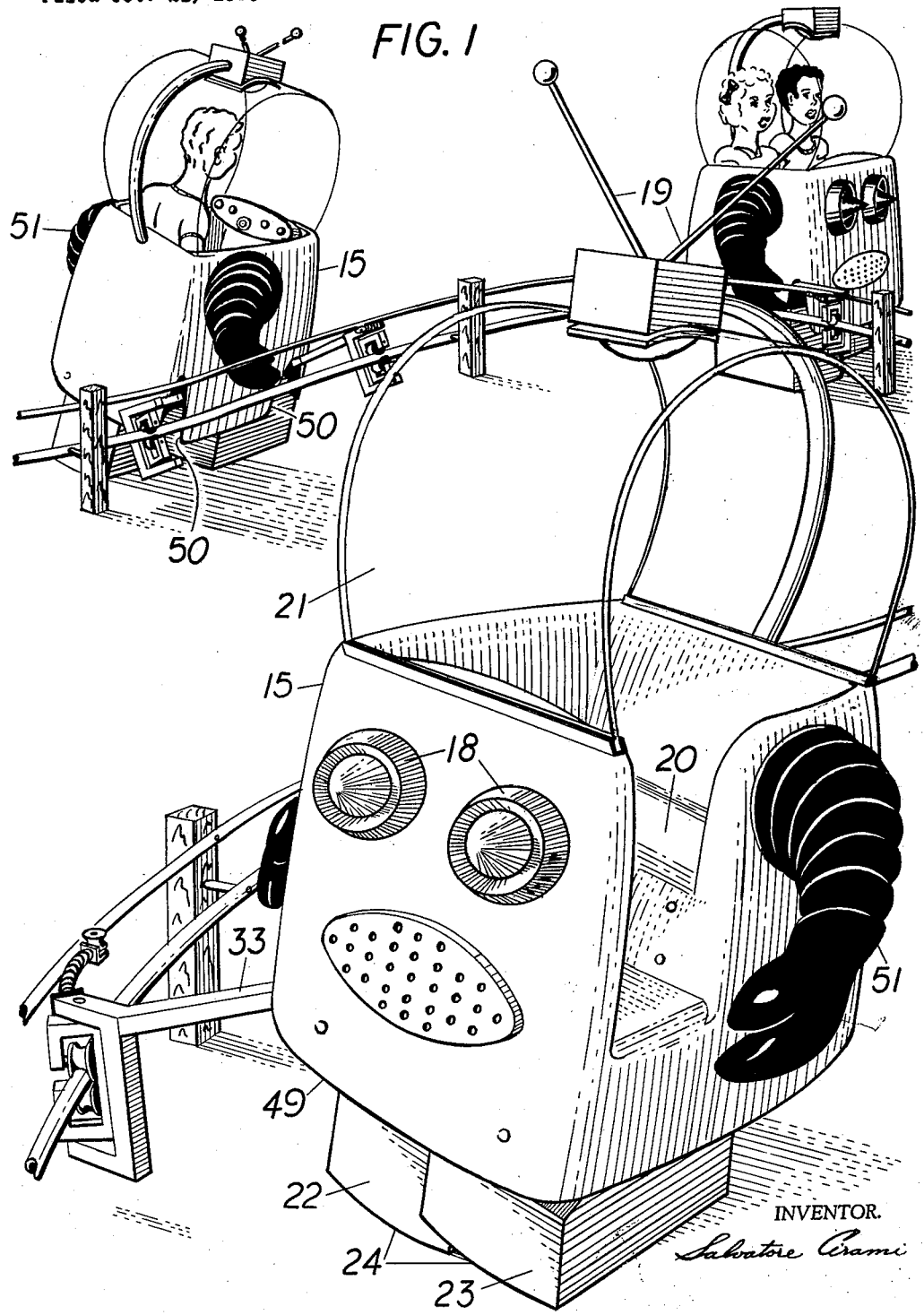

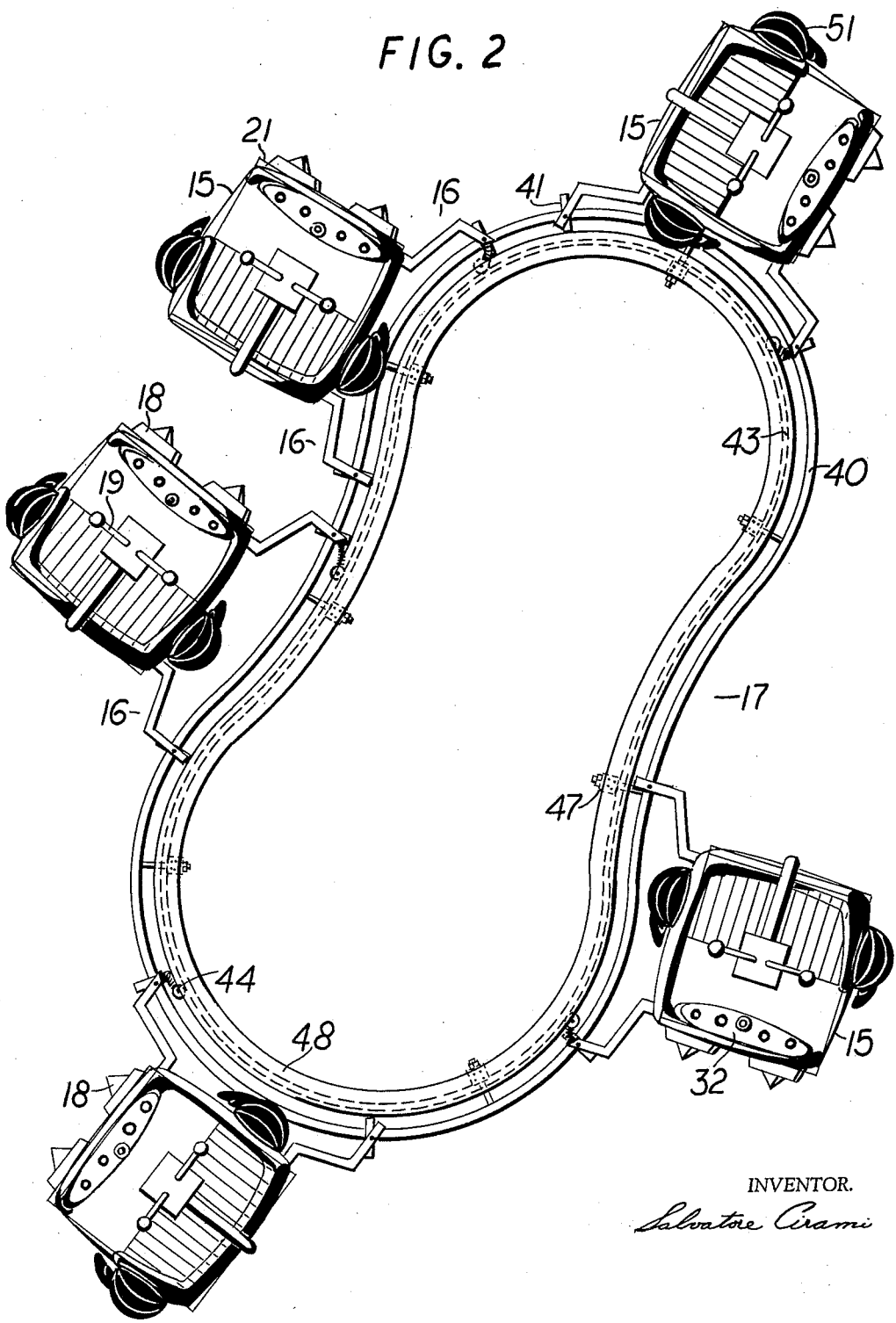

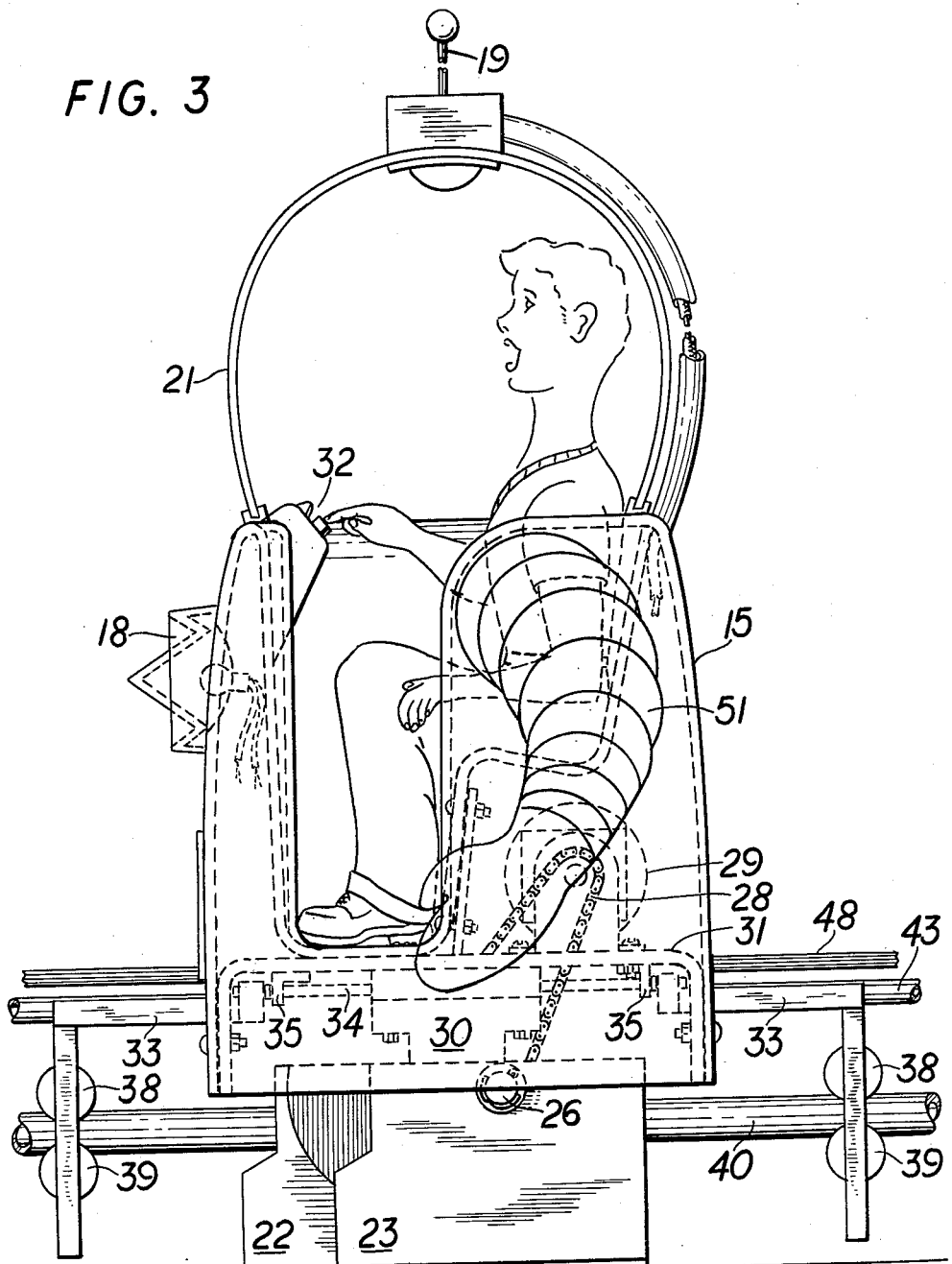

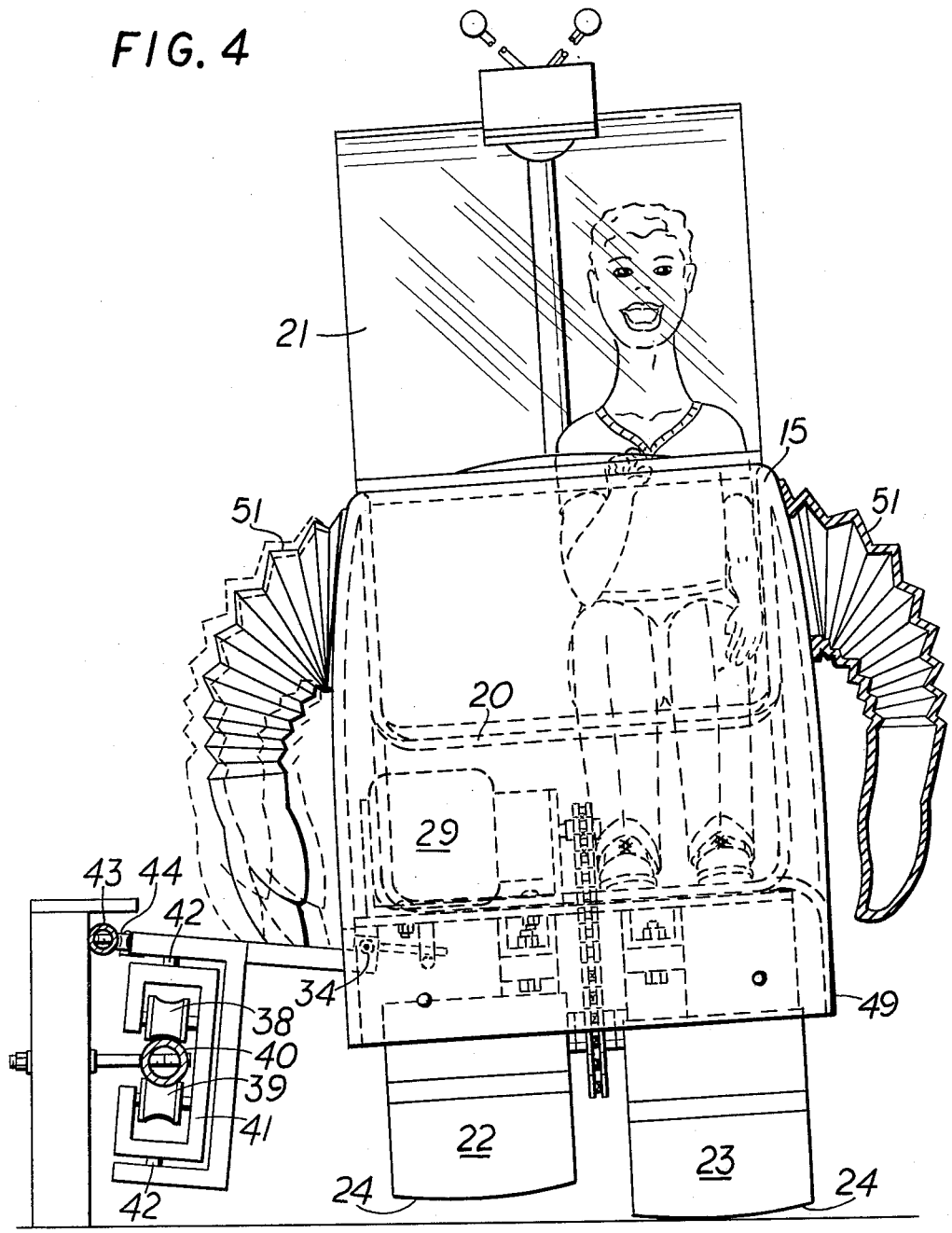

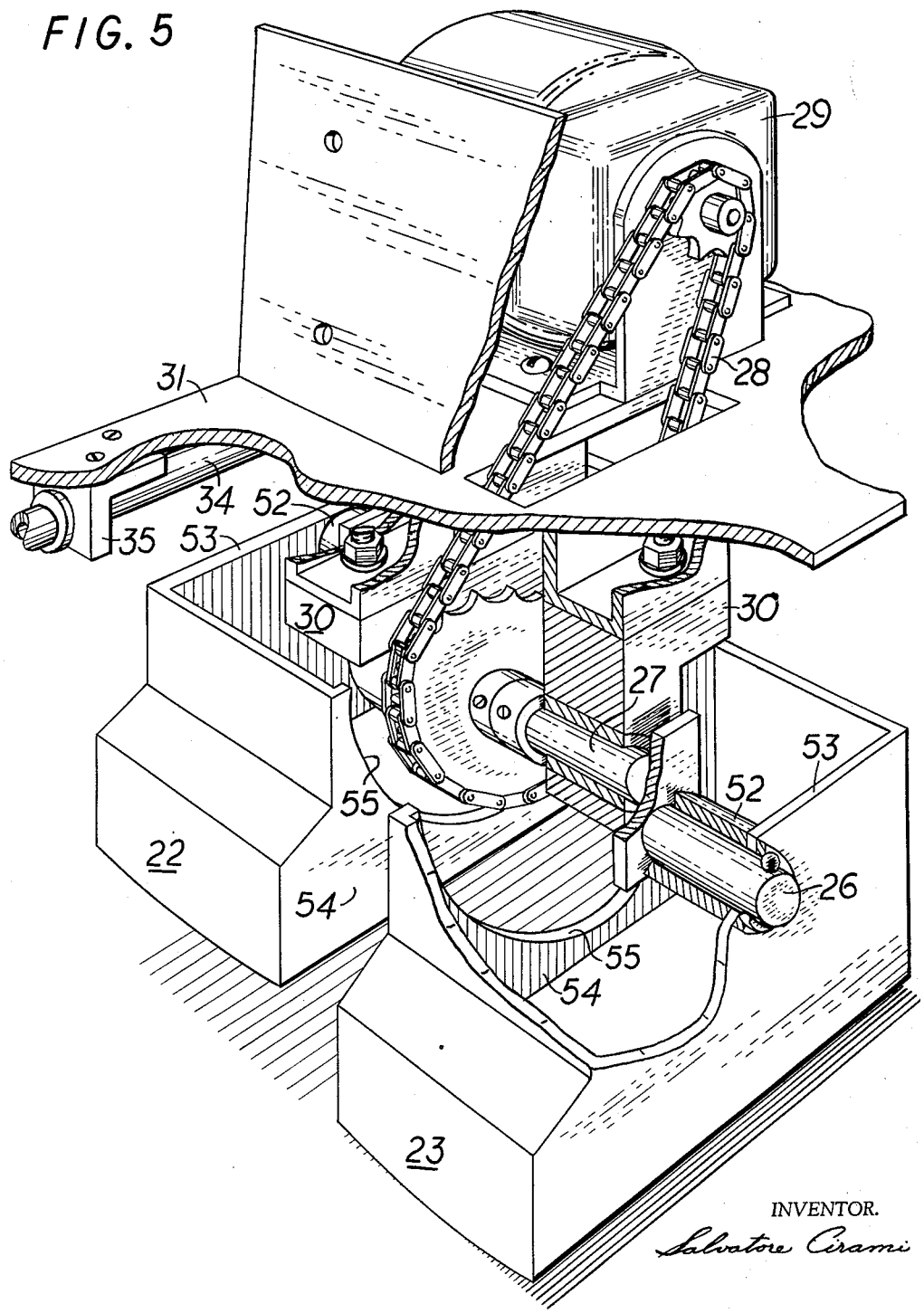

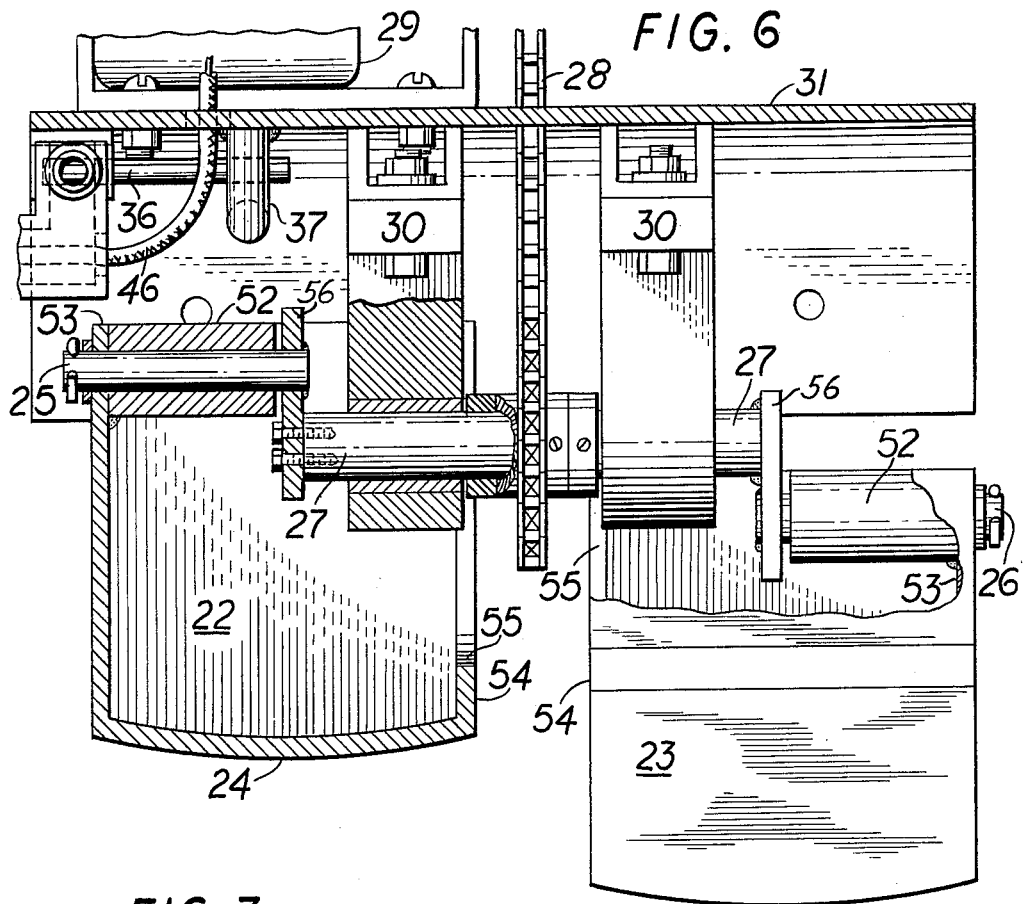
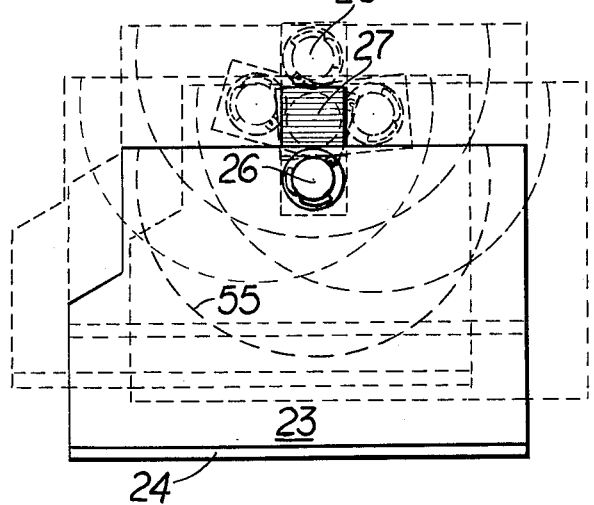

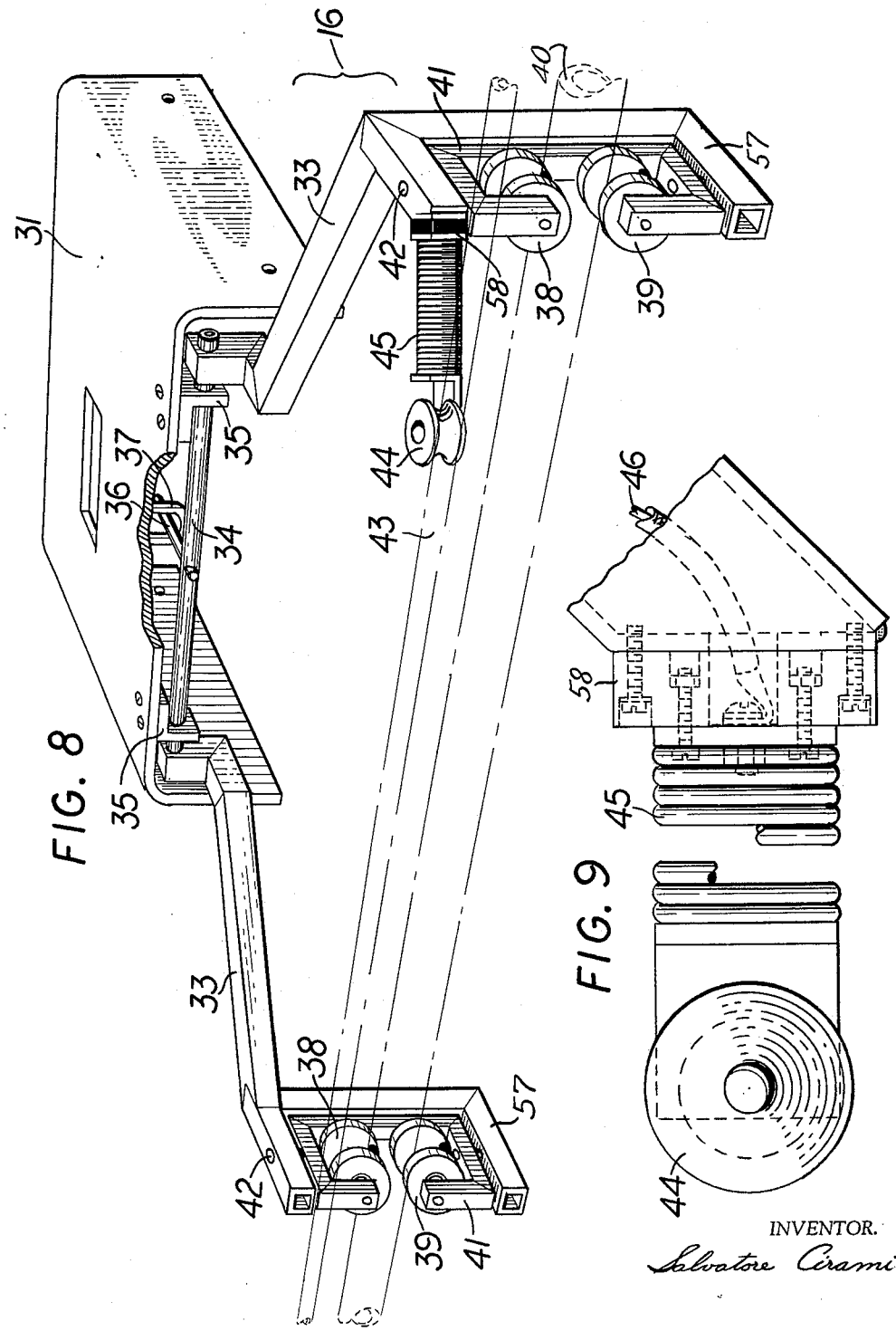

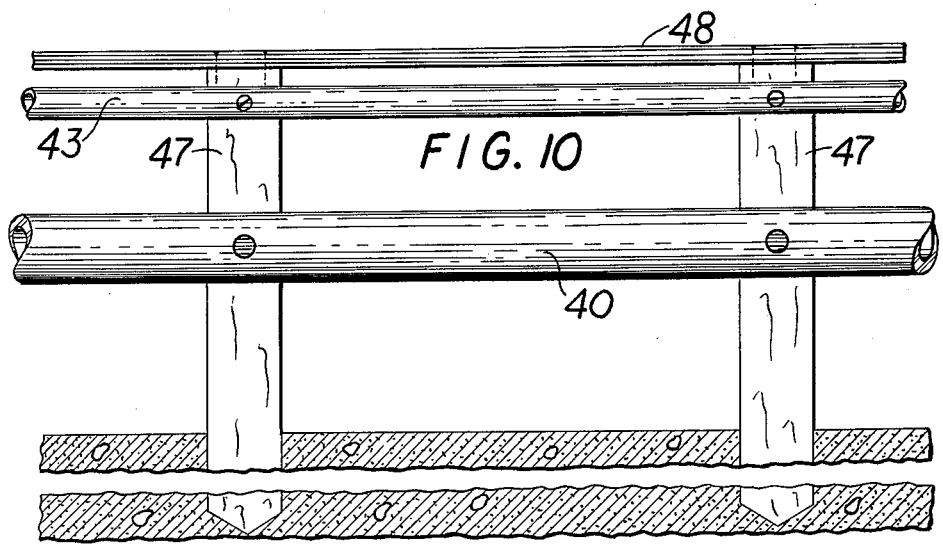
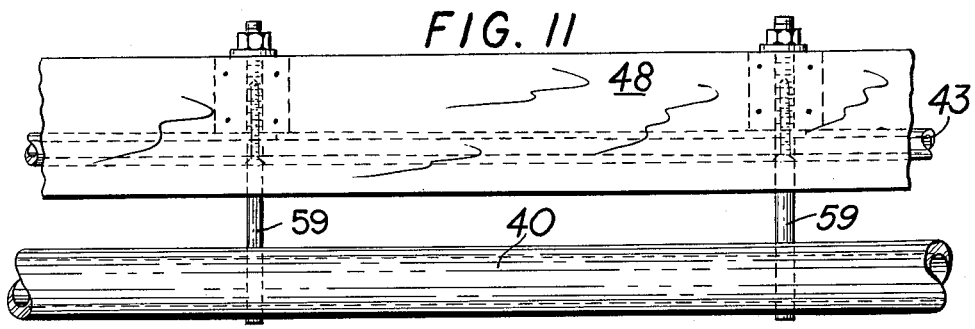
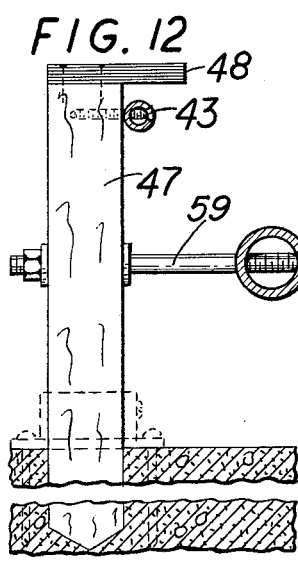
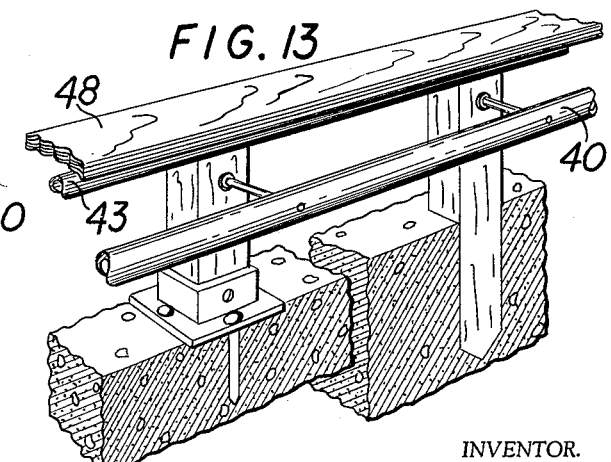

3,093,372
ROBOT AMUSEMENT RIDE
Salvatore Cirami, 75—36 Parsons Blvd., Flushing 67, N.Y.
Filed Oct. 21, 1958, Ser. No. 768,793
7 Claims. (Cl. 272—34)

The invention herein disclosed relates to amusement rides.

General objects of the invention are to provide a robot or automation form of conveyance traveling with a walking gait simulating the movement of a human being.

Special objects of the invention are to provide a conveyance of this type which will be attractive from the unusual and sensational standpoint and which will be entirely practical and safe for children and other riders.

Other special objects of the invention are to provide the robot mechanism in as simple a form as possible and which will not require special servicing and which will be free of complicated parts likely to get out of order.

Other desirable objects and the novel features through which the purposes of the invention are accomplished are set forth or will appear in the course of the following specification.

The drawings accompanying and forming part of the specification illustrate a present practical embodiment of the invention but structure and relation of parts may be modified and changed as regards the immediate illustration all within the true intent and scope of the invention as herein defined and claimed.

FIG. 1 in the drawings is a perspective view illustrating in a general way the traverse of the robot conveyances about a closed loop guiding and supplying energy to the walking conveyances, parts of the guiding structure shown broken away.

FIG. 2 is a top plan view of a group of five of the robot cars traveling about a closed guiding and power supplying loop or trackway.

FIG. 3 is a side elevation of one of the robot units and related trackway, with parts broken and appearing in section.

FIG. 4 is a front view of the same unit with parts shown in section.

FIG. 5 is a broken part sectional perspective view of the motor and drive mechanism for the feet elements of the robot.

FIG. 6 is a broken vertical sectional view of the same.

FIG. 7 is a side elevation and diagrammatic view illustrating different positions of one of the foot elements.

FIG. 8 is a broken part sectional perspective view showing the base of the robot figure and the yoke structure linking it to the guide and power rails of the track.

FIG. 9 is a broken part sectional detail of the spring mounted contact roller which engages the power rail.

FIGS. 10, 11, 12 and 13 are detail views of the power and guide rail structure, FIG. 10 being a broken part sectional front elevation, FIG. 11 a broken part sectional top plan, FIG. 12 a cross sectional view and FIG. 13 a broken part sectional perspective view.

Referring first to FIGS. 1 and 2 it will be seen that the invention comprises robot bodies 15 of passenger carrying size containing self-propulsion mechanism and linked by yokes 16 to a guide and power supply track 17 which may be in the form of a continuous loop to thereby automatically return outgoing robots to the starting station.

The robot bodies may be made up in various fanciful forms and be equipped with eye simulating lights 18, space antennas 19 and other fanciful or attention attracting devices.

Particularly though these units are built with passenger compartments, preferably with seating accommodations as indicated at 20. These passenger compartments may be open at one or both sides to admit a rider or riders and they may have plastic or other transparent tops 21 to suggest the robot's head. The top is open at both sides not only for passenger access, but also to provide ventilation adequate to dissipate summer heat.

The walking action is effected by mounting the robot body on feet 22, 23 shown in the form of hollow open top boxes having somewhat rounded sole surfaces 24 enabling the figure to rock from side to side to simulate a walking gait, FIG. 4.

In FIGS. 5 and 6 a rotatable crankshaft (comprising a main shaft 27 with a perpendicular offset 56 at each end in opposed throw, and minor shafts 25, 26 supported by the offsets and parallel with the main shaft) is journaled in spaced apart bearings 30 depending from under a base plate 31.

A geared down electric motor 29, FIG. 5 is mounted on top of the base plate with power transmission means 28 extending through a slot in the base plate connecting the motor to the portion of the main shaft exposed between the bearings.

Feet 22, 23 in the form of low, hollow, open-top boxes with a large cutout 55 in their inboard wall 54 are provided with horizontally arranged shaft retaining means 52 fixed to the outboard wall 53. The cutouts and open tops permit the bearings and crankshaft assembly to set down into the boxes. By containing the actuating elements within them, the feet make a major contribution to low vehicular height. This hollow box feature, by concealing the drive means, enhances the machine's usefulness in amusement ride applications by creating wonderment as to the vehicle's motivation. It also protects operating parts from ground dust raised by the feet pounding on terrain dried by summer heat.

The shaft retaining means 52 is designed to retain the minor shafts, being so positioned that each box will hang in balanced dependence from its respective minor shaft. This relationship is shown in FIG. 7 where one foot or box is shown in some of the positions through which it will pass in each revolution of the crankshaft. The shaft retaining means is positioned high enough above the bottom of the box so that the offset will clear the bottom when the foot is in the uplifted position. Because the foot is free to pivot around the minor shaft, the sole 24 remains level as the crankshaft rotates.

In operation, rotation of the crankshaft by the motor causes the feet to be alternately lifted, advanced, lowered and returned in a plane perpendicular to the axis of the crankshaft. In this way, each foot in turn supports and advances the vehicle a distance equal to twice the throw of the actuating crank.

Motor and light controls or other controls may be provided in the passenger compartment in simulation of the instruments in a space ship or the like, as indicated at 32 in FIG. 3.

The yokes 16 which link the robots to the track are made up of divergent arms 33 rigidly fixed on the ends of a shaft 34 journaled in bearings 35 on the underside of the bed plate 31, FIG. 8.

To increase the merriment of occupants and the entertainment of onlookers I permit the vehicle to fall slightly to the side of the uplifted foot. The bearings 35 serve to provide a flexible connection between the vehicle and the yoke to allow this rocking motion—limited by lever 36 projecting from rocking shaft 34 into a confining loop 37. The yielding relationship between the yoke and the trackway permits the vehicle to adapt to irregularities in the terrain. This yielding relationship is attained by providing the guide rail in a circular cross-section; shaping the rail contact members 38, 39 to match; and making the laterally projecting guide rail supports narrower in cross-section than the guide rail; thereby allowing the yoke some rotation in a plane perpendicular to the length of the guide rail.

Companion rollers 38, 39 confine the ends of the yoke to the guide rail 40, each pair of rolls 38, 39 being journaled in a C-shaped rack 41, swivelled on vertical pivots 42 in the C-shaped frame 57.

Current for operation of the motors is taken off a power rail 43 by means of contact rollers 44 yieldingly carried by spring 45 connected by wiring 46 with the motor. The guide rail 40 may serve as the return conductor for the circuit. The insulating block 58 electrically isolates the roller and spring assembly from the rest of the vehicle.

FIGS. 10 to 13 show how the guide and conductor rails 40, 43 may be carried by stanchions 47 and be protected by an overstanding guard 48.

The invention provides an amusement ride in which each car or transportation unit has a rocking intermittent forward advancing movement simulating that of walking and giving the riders more or less the sensation of a walking giant. In this action the riders, which may be children, are surrounded and protected in the body of the automaton and thus kept safe and secure for the round trip afforded by the loop of track.

The walking mechanism is of simple rugged construction not liable to get out of order and not requiring any particular service attention or adjustment. With a number of the robots in line on the same trackway various different amusing and interesting effects may be accomplished by starting, stopping and otherwise controlling the different units, possibly from a central station or by means of controls in the individual cars.

The yokes 16 with the divergent arms riding the guide track provide substantial means for holding the robots against tipping either forward or backward while affording them sufficient flexibility for walking movement.

To carry out or complete the illusion of a walking figure the body of the device may have a dependent skirt 49 coming down over the feet or shoes 22, 23 and which is shown as slotted at the inner side at 50 in FIG. 1 to pass the divergent arms 33 of the guide yoke.

For further realism the figures have protruding arms 51, which may be jointed or resilient to swing with the movements of the figures.

What is claimed is:

1. A stepping robot adapted to the carriage of one or more passengers for their merriment and the entertainment of onlookers, comprising:
   a torso in the form of an open top passenger compartment having a floor and provided with walls arranged upright and immediately encircling passengers in such manner as to confine and restrict their movement in said compartment, said walls proportioned reaching no higher than shoulder height of said passengers;
   a head in the form of an enclosure attached on top of said compartment, constructed large enough to encompass the head and shoulders of said passengers and so constructed and arranged as to provide visibility for said passengers and ventilation of said compartment;
   arms attached on said compartment;
   a single pair of foot members, said foot members located depending and spaced apart from the underside of said floor a distance adequate to provide passing clearance between the top of said foot members and the underside of said floor;
   means to alternately lift, advance, lower and return said foot members, said means located under said floor and fixed to said compartment, and so constructed and arranged as to support the weight of said compartment on said foot members;
   a motor connected to drive said means;
   the combination so constructed and arranged as to provide a passenger carrying robot having a space inside its head contiguous with a space inside its torso suitable for occupancy by passengers, and so proportioned that said passengers can occupy the space at the conjunction of the head and torso with sufficient freedom to turn about in the act of waving and shouting to onlookers, although the robot is provided with a compact torso and is scaled such that they must occupy both the head and torso simultaneously;
   the combination so constructed and arranged that the lifting, advancing, lowering and returning of said foot members by said means displaces the compartment for the merriment of its occupants and to create for the entertainment of onlookers the illusion of a walking robot.

2. A stepping robot adapted to the carriage of one or more passengers for their merriment and the entertainment of onlookers, comprising:
   a torso in the form of an open top passenger compartment having a floor and provided with walls arranged upright and immediately encircling passengers in such manner as to confine and restrict their movement in said compartment; a single seat, said seat positioned rearward in said compartment and so constructed and arranged as to provide a space under said seat suitable to house a motor; said walls proportioned reaching no higher than shoulder height of seated passengers;
   a head in the form of an enclosure attached on top of said compartment, constructed large enough to encompass the head and shoulders of said passengers and so constructed and arranged as to provide visibility for said passengers and ventilation of said compartment;
   said compartment provided with an opening for passenger access, said opening located forward of said seat and extending from the top edge of a wall of the compartment downward toward said floor; said enclosure provided with an opening corresponding with and effectively vertically elongating the opening in the compartment, so arranged as to form in combination with same, a passenger entranceway;
   arms attached on said compartment;
   a single pair of foot members, said foot members located depending and spaced apart from the underside of said floor a distance adequate to provide passing clearance between the top of said foot members and the underside of said floor;
   means to alternately lift, advance, lower and return said foot members, said means located fixed to and depending from the underside of said floor, and so constructed and arranged as to support the weight of said compartment on said foot members;
   said foot members proportioned short enough in height—in combination with said means, and measured when both foot members are standing in the same level plane—that a person standing before said entranceway with one foot on said plane, can place his other foot on the compartment floor and lift himself up into said compartment;
   a motor located in the space under the seat and connected to drive said means;
   the combination so constructed and arranged as to provide a passenger carrying robot having a space inside its head contiguous with a space inside its torso suitable for occupancy by passengers, and so proportioned that said passengers can occupy the space at the conjunction of the head and torso with sufficient freedom to turn about in the act of waving and shouting to onlookers, although the robot is provided with a compact torso and is scaled such that they must occupy both the head and torso simultaneously;

the combination so constructed and arranged that the lifting, advancing, lowering and returning of said foot members by said means displaces the compartment for the merriment of its occupants and to create for the entertainment of onlookers the illusion of a walking robot.

3. A stepping robot adapted to the carriage of one or more passengers for their merriment and the entertainment of onlookers, comprising:

a torso in the form of an open top passenger compartment having a floor and provided with walls arranged upright and immediately encircling passengers in such manner as to confine and restrict their movement in said compartment, said walls proportioned reaching no higher than shoulder height of said passengers;

a head in the form of an enclosure attached on top of said compartment, constructed large enough to encompass the head and shoulders of said passengers and so constructed and arranged as to provide visibility for said passengers and ventilation of said compartment;

arms attached on said compartment;

a single rotatable crankshaft; said crankshaft employed to alternately lift, advance, lower and return—which movements constitute the phases of a stepping cycle—a single pair of foot members; said crankshaft comprising a main shaft with an offset at each end and in opposed throw and a minor shaft supported by each offset and parallel with the main shaft; said crankshaft located under said floor, disposed such that the main shaft lies parallel to the underside of the floor and transverse to the direction of stepping intended for the robot;

means to support said compartment on said crankshaft; said means so constructed and arranged as to hold said crankshaft away from the underside of the floor a distance adequate to provide passing clearance between the top of said foot members and the underside of said floor during the lifting and advancing phase of the stepping cycle;

a motor connected to rotate said crankshaft;

a single pair of foot members; each foot member comprising a base, a bearing, and means to support said bearing at an altitude above said base; each minor shaft provided with a foot member, and arranged journaled in the bearing that comprises a part of said foot member;

said bearing so arranged relative to said base that the longitudinal axis of a journal aperture in the bearing lies parallel to a horizontal reference surface upon which said base is placed, said base will hang in balanced dependence from the minor shaft arranged journaled in the bearing, and the altitude of said longitudinal axis of the reference surface does not exceed the length of said base as measured in a plane that is intersected perpendicularly by said longitudinal axis;

the combination so constructed and arranged as to provide a passenger carrying robot having a space inside its head contiguous with a space inside its torso suitable for occupancy by passengers, and so proportioned that said passengers can occupy the space at the conjunction of the head and torso with sufficient freedom to turn about in the act of waving and shouting to onlookers, although the robot is provided with a compact torso and is scaled such that they must occupy both the head and torso simultaneously;

the combination so constructed and arranged that rotation of said crankshaft causes said foot members to be alternately lifted, advanced, lowered and returned to displace said compartment for the merriment of its occupants and to create for the entertainment of onlookers the illusion of a walking robot, and each foot member—pivoting on its cooperating minor shaft—is returned to level by the effect of gravity acting upon said base, and said base is free in the lowered position to adapt to uneven terrain.

4. A stepper comprising:

a single rotatable crankshaft, said crankshaft comprising a main shaft provided with an offset fixed at an end of said main shaft and a minor shaft provided fixed to and carried by said offset and arranged parallel to said main shaft;

means to support said crankshaft;

means to rotate said crankshaft;

a foot member comprising a base, a bearing, and means to support said bearing at an altitude above said base;

said minor shaft arranged journaled in said bearing;

said bearing so arranged relative to said base that the longitudinal axis of a journal aperture in the bearing lies parallel to a horizontal reference surface upon which said base is placed, said base will hang in balanced dependence from said minor shaft, and the altitude of said axis above said reference surface is high enough to exceed the throw of said crankshaft, and low enough that the foot member does not topple while standing on level terrain during the lowered returning phase of said minor shaft;

the combination so constructed and arranged that rotation of said crankshaft causes said minor shaft, and thereby said foot member to be lifted, advanced, lowered and returned—which movements constitute the phases of a stepping cycle, and said foot member—pivoting on said minor shaft—is returned to lovel by the effect of gravity acting upon said base, and said base is free in the lowered position to adapt to uneven terrain.

5. A stepper comprising:

a support having a level underside lying in a horizontal plane and disposed spaced above a horizontal reference surface, said support constructed suitable for attachment as an undercarriage of a vehicle;

means to alternately lift, advance, lower and return—which movements constitute the phases of a stepping cycle—a single pair of foot members in parallel vertical spaced apart planes around a horizontal axis, which axis lies parallel to the underside of said support; said means provided fixed to and depending from the underside of said support;

a single pair of foot members; each of said foot members provided in the form of a hollow open top box; each foot member comprising a base—located lying upon said reference surface—and walls fixed to and completely encircling said base; the said pair of foot members comprising two boxes placed close together under said support, the walls facing nearest each other hereinafter called inboard walls;

said means provided secured to said boxes at a place on the inside of each box, and so constructed and arranged as to alternately lift, advance, lower and return the boxes with the underside of the base of each box maintained level, and the boxes prevented from movement in any direction other than in the described vertical plane;

the inboard wall of each box provided with a cutout drawn large enough to remove a portion of the top edge of said wall and make enough of the space inside one box contiguous with the space inside the other, that said means can depend into and be arranged in said boxes, the open top of each box serving to cooperate with the cutouts in permitting said means to depend into the boxes; said cutout so planned as to provide operating clearance between the remaining portion of said wall and said means throughout each phase of the stepping cycle;

said boxes proportioned large enough to encompass said means with sufficient additional clearance between the interior surface of the base and walls of each box and all parts of said means, as to permit the movement of the boxes relative to the comparatively fixed position of said means throughout each phase of the stepping cycle;

said means so constructed and arranged as to hold said boxes away from the underside of said support a distance adequate to permit passing clearance between the top of the walls of the boxes and the underside of said support during the lifting and advancing phase of the stepping cycle;

said boxes proportioned short enough in height that—measured in a plane that is intersected perpendicularly by said horizontal axis—the altitude of the top edge of the walls of each box does not exceed the length of its base.

6. A stepper comprising:

a support having a level underside lying in a horizontal plane and disposed spaced above a horizontal reference surface, said support constructed suitable for attachment as an undercarriage of a vehicle;

a single rotatable crankshaft, said crankshaft comprising exclusively: a main shaft provided with a single offset fixed at each end of said main shaft in opposed throw, and a single minor shaft—one for each offset—provided fixed to and carried by each offset and arranged parallel to said main shaft; said crankshaft located under said support, disposed such that said main shaft lies parallel to the underside of said support; said crankshaft employed to alternately lift, advance, lower and return—which movements constitute the phases of a stepping cycle—a single pair of foot members in parallel vertical spaced apart planes around a horizontal axis lying parallel to the underside of said support;

said main shaft provided journaled in means—fixed to and depending from the underside of said support—to hold said crankshaft away from the underside of said support a distance adequate to provide passing clearance between the top of said foot members and the underside of said support during the lifting and advancing phase of the stepping cycle;

a motor connected to rotate said main shaft;

a single pair of foot members; each of said foot members provided in the form of a hollow open top box; each foot member comprising a base—located lying upon said reference surface, walls fixed to and completely encircling said base, a bearing located in said box, and means to support said bearing at an altitude above said base; each minor shaft provided with a foot member, and arranged journaled in said bearing; the said pair of foot members comprising two boxes placed close together under said support, the walls facing nearest each other hereinafter called inboard walls;

said bearing so arranged relative to said base that the longtiudinal axis of a journal aperture in the bearing lies parallel to said horizontal reference surface, said base will hang in balanced dependence from the minor shaft arranged journaled in the bearing, and the altitude of said longitudinal axis above the reference surface is high enough to exceed the throw of said crankshaft, and low enough that the foot member does not topple while standing on level terrain during the lowered returning phase of said minor shaft;

the inboard wall of each box provided with a cutout that is centered around an extension of the longitudinal axis of the bearing in the box, said cutout drawn large enough to remove a portion of the top edge of said wall and make enough of the space inside one box contiguous with the space inside the other, that the crankshaft can depend into and be arranged in the boxes, the open top of each box serving to cooperate with the cutouts in permitting the crankshaft to depend into the boxes; each cutout so planned as to provide operating clearance—between the remaining portion of the inboard wall and the crankshaft—throughout each phase of the stepping cycle;

said boxes proportioned large enough to encompass the crankshaft with sufficient additional clearance between the interior surfaces of the base and walls of the boxes and said crankshaft as to permit the movement of the boxes relative to the comparatively fixed position of said crankshaft throughout each phase of the stepping cycle;

the bearing in each box so positioned along its longitudinal axis as to cooperate with the cutouts and the open top feature of each box and the placement of the boxes close together, in permitting the crankshaft to depend into and be arranged inside the boxes and be connected with its minor shafts journaled in the cooperating bearings.

7. A foot member in the form of a hollow open top box, for use in a stepper of the type where a support having a level underside lying in a horizontal plane is provided and disposed spaced above a horizontal reference surface, where said support is constructed suitable for attachment as an undercarriage of a vehicle, where means are provided—fixed to and depending from the underside of said support—to lift, advance, lower and return—which movements constitute the phases of a stepping cycle—a single horizontally disposed shaft which is provided journaled in a foot member; said foot member comprising:

a hollow open top box having a base, walls fixed to and completely encircling said base, a bearing located in said box, and means to support said bearing at an altitude above said base;

said bearing so arranged relative to said base that the longitudinal axis of a journal aperture in the bearing lies parallel to said horizontal reference surface when the base is placed on same, said base will hang in balanced dependence from said shaft when the shaft is arranged journaled in the bearing, and the altitude of said longitudinal axis above said reference surface does not exceed the length of said base as measured in a plane that is intersected perpendicularly by said longitudinal axis;

said longitudinal axis extended in one direction to intersect a wall of the box, said wall provided with a cutout that is centered around said longitudinal axis; said cutout drawn large enough to remove a portion of the top edge of said wall, and so planned as to provide operating clearance when the shaft is arranged journaled in said bearing—between the remaining portion of said wall and the means to lift, advance, lower and return said shaft—throughout each phase of the stepping cycle, the open top of said box serving to permit said last mentioned means to depend into the box from the underside of said support;

said box proportioned large enough to encompass said last-mentioned means with sufficient additional clearance between the interior surface of the base and walls of the box and all parts of said means, as to permit the movement of the box relative to the comparatively fixed position of said means throughout each phase of the stepping cycle;

said bearing so positioned along its longitudinal axis as ot cooperate with said cutout and the open top feature of the box in permitting some portion of said means to depend into and be arranged inside the box and be arranged with said horizontally disposed shaft journaled in said bearing.

References Cited in the file of this patent

UNITED STATES PATENTS

| | | |
|---|---|---|
| 880,526 | Hele-Shaw | Mar. 3, 1908 |
| 1,652,975 | Davidson | Dec. 13, 1927 |
| 1,660,139 | Shellabarger | Feb. 21, 1928 |
| 1,877,656 | Giraud | Sept. 13, 1932 |
| 1,880,138 | Hubl | Sept. 27, 1932 |
| 2,036,427 | Meler | Apr. 7, 1936 |
| 2,147,215 | Price | Feb. 14, 1939 |
| 2,155,002 | Villemejan | Apr. 18, 1939 |
| 2,371,368 | Wallace | Mar. 13, 1945 |